UNITED STATES PATENT OFFICE.

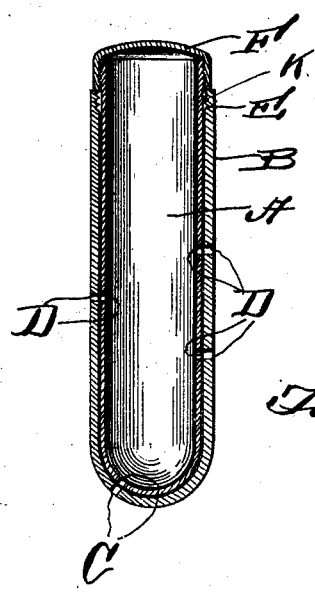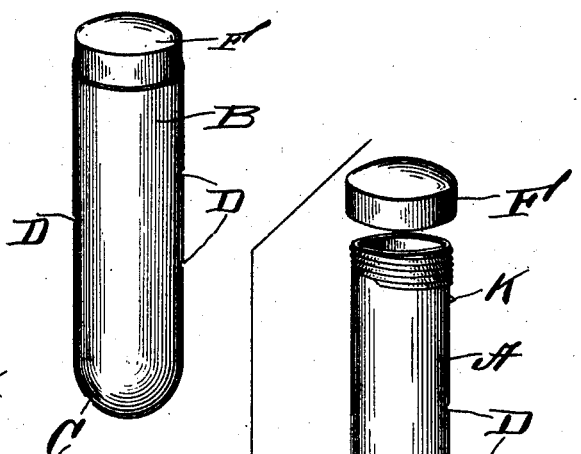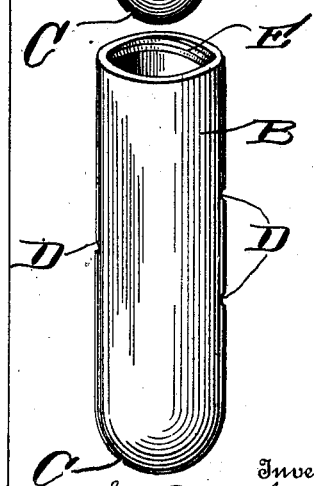

EDWARD S. BALTHROP, OF JACKSON, TENNESSEE.

INHALER.

972,318.  Specification of Letters Patent.  Patented Oct. 11, 1910.

Application filed April 27, 1910. Serial No. 558,005.

*To all whom it may concern:*

Be it known that I, EDWARD S. BALTHROP, citizen of the United States, residing at Jackson, in the county of Madison and State of Tennessee, have invented certain new and useful Improvements in Inhalers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in inhalers and comprises a simple and efficient device of this nature having various details of construction and combinations and arrangements of parts which will be hereinafter fully described and then specifically defined in the appended claim.

I illustrate my invention in the accompanying drawings, in which:—

Figure 1 is a perspective view of my improved inhaler. Fig. 2 is a central longitudinal sectional view through the device, and Fig. 3 is a detail view of the parts disassembled.

Reference now being had to the details of the drawings by letter, A designates an inner tube and B an outer tube, one adapted to telescope within the other and snugly fit the same, so as to prevent leakage of the medicine contained within the inner tube. The inner ends of said tubes are provided with inhaling apertures C and also apertures D are formed in the circumference thereof, the aperture in the end being adapted for use for inhaling into the throat, while the apertures in the circumference are for the purpose of admitting air and inhaling in the nose. Positioned on the circumference of said inner tube adjacent to its outer end is a lug K which is adapted to engage threads on a threaded portion or groove E formed in the inner circumference of the outer tube for the purpose of holding the two tubes in place, one within the other. A cap F having a flange which is interiorly threaded is adapted to screw over the end of the inner tube and form an air tight connection and avoid the escape of the medicine. When the cap is adjusted in place, the inner end will bear against the end of the outer tube, thus making a secure joint.

From the foregoing, it will be noted that, by the provision of an inhaler as shown and described, a simple and efficient device is afforded which, when not in use, may be kept air tight to prevent the escape of any medicament within the device. When desired to utilize the same, one tube may be turned relative to the other to allow the apertures to come in registration.

What I claim to be new is:—

An inhaler comprising an inner and an outer tube, circumferentially apertured, one telescoping within the other, the inner tube having circumferential threads adjacent to its open end, threads upon the inner surface of the outer tube, a lug projecting from the outer surface of the inner tube and engaging the threads on the inner circumference of the outer tube, a cap fitted about the outer end of the inner tube and bearing against the end of the outer tube.

In testimony whereof I hereunto affix my signature in the presence of two witnesses.

EDWARD S. BALTHROP.

Witnesses:
J. F. TAYLOR,
T. E. FUTRELL.